United States Patent [19]

Ishida et al.

[11] 4,428,891

[45] Jan. 31, 1984

[54] THROTTLE VALVE DRIVING MECHANISM

[75] Inventors: Takashi Ishida, Ohi; Noboru Tominari, Tokyo, both of Japan

[73] Assignee: Mikuni Kogyo Kabushiki Kaisha, Tokyo, Japan

[21] Appl. No.: 378,087

[22] Filed: May 14, 1982

[30] Foreign Application Priority Data

May 25, 1981 [JP] Japan .................................. 56-78052

[51] Int. Cl.[3] .............................................. F16K 31/52

[52] U.S. Cl. ...................................... 261/65; 251/133; 251/257; 74/516

[58] Field of Search .................. 261/65; 251/133, 237; 74/516

[56] References Cited

U.S. PATENT DOCUMENTS

| | | | |
|---|---|---|---|
| 2,722,396 | 11/1955 | Carr | 251/233 |
| 3,168,085 | 2/1965 | Stelter | 251/237 |
| 4,327,894 | 5/1982 | Ewing et al. | 251/133 |

FOREIGN PATENT DOCUMENTS

| | | | |
|---|---|---|---|
| 503374 | 5/1958 | Canada | 251/133 |
| 2442623 | 10/1975 | Fed. Rep. of Germany | 251/133 |
| 330873 | 6/1930 | United Kingdom | 251/133 |

*Primary Examiner*—Tim R. Miles

*Attorney, Agent, or Firm*—Owen, Wickersham & Erickson

[57] ABSTRACT

A throttle valve driving mechanism comprising an actuator disposed near a throttle valve shaft, and an oscillating slide block mechanism disposed between an actuator shaft and said throttle valve shaft. Said oscillating slide block mechanism comprises a throttle lever provided at one end thereof with a roller, an actuator shaft disposed in a position on a straight line between said throttle valve shaft and said roller at the time when the throttle valve is fully closed and a certain distance away from the center of said roller toward the center of said throttle valve shaft, a rotatable lever secured to said actuator shaft, said rotatable lever having a groove within which said roller slides freely with small clearances, the center of said throttle valve shaft, the center of said roller and the center of said groove being arranged in the same direction when the throttle valve is fully closed. Said oscillating slide block mechanism is adapted to ensure a higher resolution of the opening of the throttle valve in a range of rotation of said actuator corresponding to a range of small opening angles of the throttle valve, and to give a higher speed to the action of the throttle valve in a range of rotation of said actuator corresponding to a range of medium or large opening angles of the throttle valve.

2 Claims, 4 Drawing Figures

THROTTLE VALVE DRIVING MECHANISM

BACKGROUND OF THE INVENTION

The present invention relates to a throttle valve driving mechanism comprising an oscillating slide block mechanism disposed between a throttle valve and an actuator thereof, said driving mechanism maintaining desired air flow characteristics by increasing the resolution of air flow control in a range of small opening angles of the valve and by increasing the speed of the valve action in a range of large opening angles of the valve.

When a throttle valve for an internal combustion engine is actuated by means of an actuator, the valve is required to control air flow precisely with a high resolution in a range of small opening angles thereof and also to move between a fully closed position and a fully opened position as quickly as possible. The actuator of the valve is desired to have a small power, small size and light weight. If only the resolution of air flow control is taken into account, the speed of the valve action is decreased. On the other hand, if only the speed of the valve action is taken into account, the resolution of air flow control is decreased.

BRIEF SUMMARY OF THE INVENTION

It is an object of the present invention to provide a throttle valve driving mechanism which satisfies the aforesaid requirements and solves the aforesaid problem.

It is another object of the present invention to provide a throttle valve driving mechanism in which importance is attached to the resolution of air flow control in a range of small opening angles of the valve and it is attached to the speed of the valve action in a range of large opening angles of the valve.

These and other objects have been attained by a throttle valve driving mechanism comprising an oscillating slide block mechanism disposed between a throttle valve shaft and an actuator shaft. A preferable oscillating slide block mechanism used in an embodiment of the present invention comprises a roller being provided at one end of a throttle lever; an actuator axis being disposed in a position on a straight line between said roller and a throttle valve shaft and some distance away from the center of said roller toward the center of said throttle valve shaft; a rotatable lever being secured to an actuator shaft; said rotatable lever having a groove within which said roller slides freely with small clearances; said throttle valve shaft being connected with said actuator shaft through a series of said throttle lever, roller and groove; the center of said throttle valve shaft, the center of said roller and the center of said groove being arranged in the same direction when the throttle valve is fully closed. Since the roller serving as a slide block is attached to the end of the throttle lever and the throttle lever is swung by moving the slide block by means of the actuator, it is possible to increase the resolution of air flow control in a range of small opening angles of the valve by decreasing the degree of the valve opening relative to the angle of rotation of the actuator, and it is also possible to increase the speed of the valve action in a range of large opening angles of the valve by increasing the degree of the valve opening relative to the angle of rotation of the actuator. Furthermore, since the actuator drives the slide block attached to the end of the throttle lever, the actuator can be a small-sized, light-weight one having a small power.

DETAILED DESCRIPTION

The present invention will now be described in detail with reference to the attached drawings.

Figure 1:
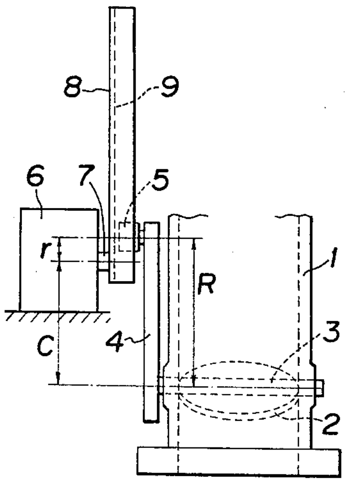
FIG. 1 is a front view of a throttle valve driving mechanism according to the present invention.
Figure 2:
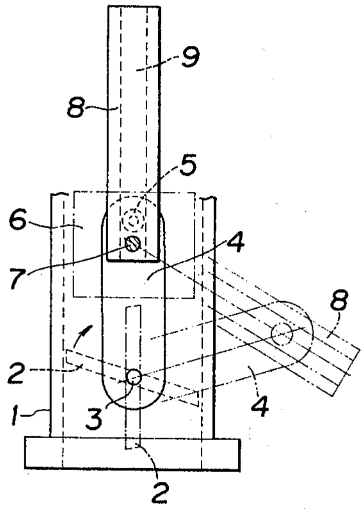
FIG. 2 is a side view thereof.
Figure 3:
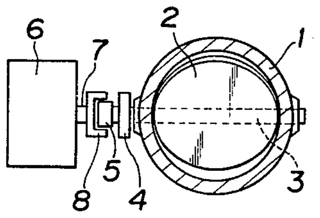
FIG. 3 is a plan view thereof.

As shown in FIG. 1, a throttle lever 4 is secured to one end of the shaft 3 of a throttle valve 2 disposed within the intake bore 1 of an internal combustion engine, and a roller 5 is provided at one end of said throttle lever 4. An actuator 6 is disposed outside said intake bore 1, and a rotatable lever 8 is attached to the driving shaft 7 of said actuator 6, said rotatable lever 8 having a channel or groove 9 within which said roller 5 serving as a slide block slides. Said roller 5 at the end of said throttle lever 4 is in a position at a distance R from the center of said throttle valve shaft 3 as shown in FIG. 1. Said driving shaft 7 of the actuator 6 is in a position at a distance r away, toward said throttle valve shaft 3, from the position of said roller 5 at the time when the throttle valve 2 is fully closed, there being a distance C between the center of said driving shaft 7 and the center of said throttle valve shaft 3.

Figure 4:
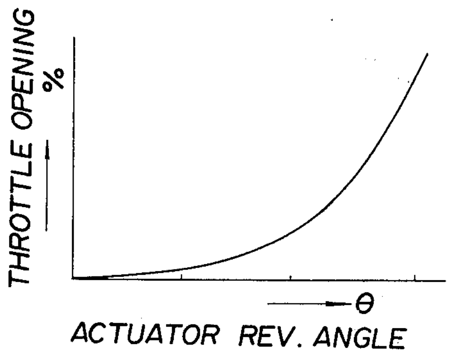
FIG. 4 is a diagram showing the relationship between the angle of rotation of an actuator and the opening of a throttle valve.

In the throttle valve driving mechanism having the construction described above, the amount of the opening or closing action of the throttle valve 2 when it is in a nearly closed position is decreased to an amount equal to r/R of the angle of rotation $\theta$ of the actuator 6, while the amount of the opening or closing action of the throttle valve 2 when it is in a nearly opened position is increased to an amount approximately equal to $$\left\{1 + \tfrac{1}{2}\left(\frac{C}{R}\right)^2\right\} \div \left\{1.5 - \frac{r}{C}\right\}$$

of the angle of rotation $\theta$ of the actuator 6. Consequently, the throttle valve 2 ensures the desired resolution of air flow control in a range of small opening angles thereof and quick actions in a range of large opening angles thereof, as shown in FIG. 4.

In the embodiment illustrated in the drawings, said rotatable lever 8 is provided with the channel or groove 9. Alternatively, the rotatable lever 8 may be a member having the shape of the letter L in section, said roller 5 being adapted to slide on the flange of said member, and a spring being attached to said throttle valve shaft 3 so as to give it a tendency to close the throttle valve 2.

Generally, the air flow characteristics of the throttle valve are sensitive to the change of the valve opening in a range of small opening angles of the valve, and are less-sensitive thereto in a range of larger opening angles of the valve. At the time of idling, for instance, the opening angle of the valve is less than several degrees, and in such a range, air flow is in proportion to the opening angle of the valve. If air flow is to be controlled with an accuracy of ±1% when the opening angle of the valve is 5°, the valve has to be controlled with an accuracy ±0.05°. In this case, if R=20 mm and r=1.0 mm, then r/R=1/20 and therefore the accuracy of the actuator may be ±1°. When the opening angle of the valve is as large as 70°, ±1% thereof is ±0.7° which corresponds to ±0.5° of the actuator. However, in such a range of large opening angles of the valve, the ratio of the change of air flow to the change of the valve opening is sufficiently smaller than $\frac{1}{2}$, and therefore the accuracy of the actuator of ±1° is sufficient to ensure the accuracy of air flow control of ±1%. Consequently, the accuracy of the actuator may be the same in all the range of opening angles of the valve, and a stepping motor, DC servo motor, etc. may be used as the actuator.

The present invention can be applied not only to the conventioned fuel feed system (carbureter) of an internal combustion engine but also to a fuel priority system, as disclosed in U.S. patent application Ser. No. 228,973, in which the flow rate of fuel depends only upon the operation of the accelerator by the operator (driver), an optimum air flow being calculated on the basis of fuel flow input and other information, the calculated value being delivered as an electric signal and put into the actuator to control the opening angle of the throttle valve. In such a case, it is possible to further enhance the performance of the system by reducing errors in the valve opening relative to the setting accuracy of the actuator.

As many apparently widely different embodiments of the present invention may be made without departing from the spirit and scope thereof, it is to be understood that the invention is not limited to the specific embodiments thereof except as defined in the appended claims.

What is claimed is:

1. A throttle valve driving mechanism comprising a throttle valve having a shaft for angularly positioning the valve in an intake bore, an actuator having an actuator shaft and disposed near said valve shaft for determining the angular position of said throttle valve, and an oscillating slide block mechanism disposed between said actuator shaft and said valve shaft, said mechanism being adapted to ensure a higher resolution of the opening of the throttle valve in a range of rotation of said actuator corresponding to a range of small opening angles of the throttle valve, and to give a higher speed to the action of the throttle valve in a range of rotation of said actuator corresponding to a range of medium or larger opening angles of the throttle valve, said oscillating slide block mechanism including a throttle lever provided at one end thereof with a roller and connected to said valve shaft at its other end, the axis of said actuator shaft being substantially disposed along a straight line between said throttle valve shaft and said roller at the time when the throttle valve is fully closed and a certain distance away from the center of said roller toward the center of said valve shaft, and a rotatable lever attached to said actuator shaft having a groove within which said roller slides freely with small clearances.

2. A throttle valve driving mechanism as claimed in claim 1, wherein the axis of rotation of said throttle valve shaft and the center line of said roller both intersect a line coincident with the center line of said grove in said rotatable lever when the throttle valve is fully closed.

* * * * *